US009379379B2

(12) United States Patent
Miyahara et al.

(10) Patent No.: US 9,379,379 B2
(45) Date of Patent: Jun. 28, 2016

(54) CATHODE MATERIAL FOR LITHIUM ION SECONDARY BATTERIES, CATHODE MEMBER FOR LITHIUM ION SECONDARY BATTERIES, LITHIUM ION SECONDARY BATTERY, AND METHOD FOR PRODUCING CATHODE MATERIAL FOR LITHIUM ION SECONDARY BATTERIES

(75) Inventors: Masahiko Miyahara, Hamura (JP); Atsushi Nemoto, Hamura (JP); Hirokazu Sasaki, Tokyo (JP)

(73) Assignee: SHOEI CHEMICAL INC., Tokyo (JP)

( * ) Notice: Subject to any disclaimer, the term of this patent is extended or adjusted under 35 U.S.C. 154(b) by 16 days.

(21) Appl. No.: 14/342,459

(22) PCT Filed: Aug. 31, 2012

(86) PCT No.: PCT/JP2012/072106
§ 371 (c)(1),
(2), (4) Date: Mar. 3, 2014

(87) PCT Pub. No.: WO2013/035632
PCT Pub. Date: Mar. 14, 2013

(65) Prior Publication Data
US 2014/0220446 A1    Aug. 7, 2014

(30) Foreign Application Priority Data
Sep. 5, 2011    (JP) ................. 2011-192576

(51) Int. Cl.
H01M 4/36      (2006.01)
C01B 33/20     (2006.01)
H01M 4/485     (2010.01)
H01M 4/525     (2010.01)
H01M 4/583     (2010.01)
H01M 10/0525   (2010.01)
C01B 33/32     (2006.01)
H01M 4/02      (2006.01)

(52) U.S. Cl.
CPC .............. *H01M 4/364* (2013.01); *C01B 33/20* (2013.01); *C01B 33/32* (2013.01); *H01M 4/366* (2013.01); *H01M 4/485* (2013.01); *H01M 4/525* (2013.01); *H01M 4/583* (2013.01); *H01M 10/0525* (2013.01); *H01M 2004/028* (2013.01); *Y02E 60/122* (2013.01); *Y02P 70/54* (2015.11); *Y02T 10/7011* (2013.01)

(58) Field of Classification Search
CPC ....... C01B 33/20; C01B 33/32; H01M 4/366; H01M 4/485; H01M 4/525; H01M 4/583; H01M 10/0525; H01M 4/364; H01M 2004/028
See application file for complete search history.

(56) References Cited

U.S. PATENT DOCUMENTS

| 2011/0136008 | A1* | 6/2011 | Hirose | B60L 11/1879 429/213 |
| 2013/0052529 | A1* | 2/2013 | Ohkubo et al. | 429/211 |
| 2013/0052544 | A1* | 2/2013 | Ohkubo et al. | 429/344 |
| 2014/0145121 | A1* | 5/2014 | Dhabi et al. | 252/506 |

FOREIGN PATENT DOCUMENTS

| CN | 101241986 A | 8/2008 |
| JP | 2001-266882 A | 9/2001 |
| JP | 2002-075364 A | 3/2002 |
| JP | 2003-034534 A | 2/2003 |
| JP | 2003-059491 A | 2/2003 |
| JP | 2003-272632 A | 9/2003 |
| JP | 2004-234977 A | 8/2004 |
| JP | 2005-519451 A | 6/2005 |
| JP | 2006-302671 A | 11/2006 |
| JP | 2007-335325 A | 12/2007 |
| JP | 2009-117261 A | 5/2009 |
| JP | 2009-170401 A | 7/2009 |
| JP | 2010-086772 A | 4/2010 |
| JP | 2010-108678 A | 5/2010 |
| JP | 2010-157405 A | 7/2010 |
| JP | 2011-029132 | 2/2011 |
| JP | 2011-034776 | 2/2011 |
| TW | 200945652 A | 11/2009 |
| TW | 201125195 A1 | 7/2011 |
| TW | 201140917 A | 11/2011 |
| WO | 2008/123311 A1 | 10/2008 |
| WO | WO 2010/089931 A1 | 8/2010 |

OTHER PUBLICATIONS

PCT International Preliminary Report on Patentability issued Mar. 12, 2014 for PCT/JP2012/072106.
PCT Written Opinion of the International Searching Authority issued Nov. 6, 2012 for PCT/JP2012/072106.
J. Moskon et al; Morphology and electrical properties of conductive carbon . . . ; Journal Power Sources, vol. 174, 2007, pp. 683-688.
R. Dominko et al; Structure and electrochemical performance of Li2MnSiO4 and Li2FeSiO4 as . . . ; Electrochem. Commun., vol. 8, 2006, pp. 217-222.
S. Bin et al; Preparation of Li2FeSiO4/C composites and its electrochemical properties; Proceedings of the 50th battery symposium; 2009, p, 111.
S. Bin et al; Preparation of Li2FeSiO4/C composites and its electrochemical properties; Proceedings of the 51st battery symposium; 2010, p. 211.
Y. Li et al; Synthesis and characterization of Li2MnSiO4/C nanocomposite cathode . . . ; Journal Power Sources, vol. 174, 2007, pp. 528-532.
A. Kojima et al; Charge-discharge performance fo Li-ion battery with Li2MSiO4 . . . ; Proceedings of the 51st battery symposium; 2010, p. 194.
Y. Kamimura et al; Synthesis and electrochemical properties of silicate . . . ; Proceedings of the 50th battery symposium; 2009, p. 30.
H. Sho et al; Li2FeSiO4/C nano fukugotai zairyo no gosei to sono . . . ; Society of Powder Tech, Japan, 2001, pp. 67-68.
International Search Report dated Nov. 6, 2012.

* cited by examiner

Primary Examiner — Muhammad Siddiquee
(74) Attorney, Agent, or Firm — Lucas & Mercanti, LLP

(57) ABSTRACT

A cathode material for a lithium ion secondary battery is a composite grain including an oxide and a carbon material. The oxide includes, as constituent elements, Li, Si and at least one of Fe and Mn. According to a measurement by an X-ray diffraction method using Cu-Kα as an X-ray source, a diffraction peak exists within a range of 2θ=33±2° and a half width of the diffraction peak is 0.55° or more. A size of the grain is 1 μm or more and 20 μm or less.

7 Claims, 5 Drawing Sheets

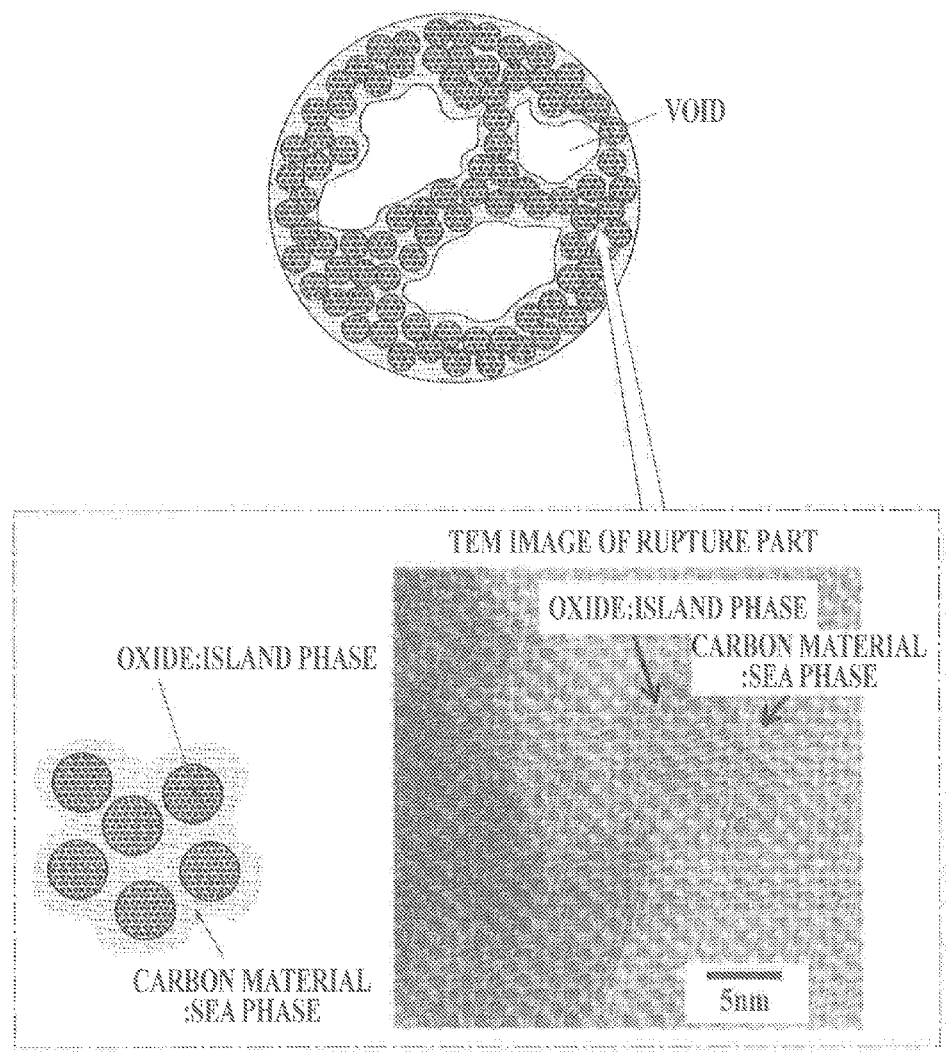

CATHODE MATERIAL FOR LITHIUM ION SECONDARY BATTERIES, CATHODE MEMBER FOR LITHIUM ION SECONDARY BATTERIES, LITHIUM ION SECONDARY BATTERY, AND METHOD FOR PRODUCING CATHODE MATERIAL FOR LITHIUM ION SECONDARY BATTERIES

CROSS REFERENCE TO RELATED APPLICATION

This Application is a 371 of PCT/JP2012/072106 filed on Aug. 31, 2012 which, in turn, claimed the priority of Japanese Patent Application No. JP2011-192576 filed on Sep. 5, 2011 both applications are incorporated herein by reference.

TECHNICAL FIELD

The present invention relates to a cathode material for lithium ion secondary batteries, a cathode member for lithium ion secondary batteries, a lithium ion secondary battery, and a method for producing the cathode material for lithium ion secondary batteries.

BACKGROUND ART

A lithium ion secondary battery has less weight and more capacity as compared, with a conventional lead secondary battery, a nickel-cadmium secondary battery and so forth and hence has been widely used as a power source for electronic devices such as a mobile phone and a notebook type personal computer. It has recently been used also as a battery for an electric vehicle, a plug-in hybrid car, a pedelec and so forth.

The lithium ion secondary battery is basically composed of a cathode, an anode, an electrolyte, and a separator.

For the anode, in general, carbon, lithium titanate or the like which allows metallic lithium or lithium ion intercalation/deintercalation is used. For the electrolyte, lithium salt and an organic solvent or an ionic liquid capable of dissolving the lithium salt sore used. The separator is placed between the cathode and the anode so as to keep electrical insulation therebetween and has pores to allow the electrolyte to pass through. For the separator, porous organic resin, glass fiber or the like is used.

The cathode is basically composed of an active material which allows lithium ion intercalation/deintercalation, an electrically conductive auxiliary which ensures an electrical conduction path (electron conduction path) to a current collector, and a binder which binds the active material and the electrically conductive auxiliary. As she electrically conductive auxiliary, a carbon material such as acetylene black, carbon black or graphite is used, be the active material of she cathode material, a metal oxide composed of lithium and a transition metal(s), such as $LiCoO_2$, $LiNiO_2$, $LiNi_{0.8}Co_{0.2}O_2$ or $LiMn_2O_4$, is used. Other examples are $LiMPO_4$, derivatives obtained from this lithium metal phosphate as the basic structure by element substitution or compositional change, $Li_2MSiO_4$, and derivatives obtained from this lithium metal silicate as the basic structure by element substitution or compositional change. M mainly contains a transition metal element(s) having a variable valency, such as Fe, Mn, Ni, and Co.

This kind of metal oxide generally has low electron conductivity, and hence, in the cathode which uses the metal oxide as the active material, the metal oxide is mixed with the electrically conductive auxiliary as described above. Efforts have been made to further improve the electron conductivity inside the cathode by coating the surface of the metal oxide as the active material with carbon or by making carbon particles, carbon fiber or the like adhere to the surface of the metal oxide, in addition to mixing the metal oxide with the electrically conductive auxiliary. (Refer to Patent Literatures 1 to 6 and Non-Patent Literature 1, for example.)

In particular, with respect to the metal oxide having significantly low electron conductivity, even if the cathode is configured by making the electrically conductive auxiliary and the metal oxide coexist therein, it is not enough to obtain excellent battery characteristics. Hence, in order to use such metal oxide, the surface of the metal oxide is coated with carbon.

Among the oxides described above, lithium iron silicate $Li_2FeSiO_4$, lithium manganese silicate $Li_2MnSiO_4$, and derivatives obtained from these as the basic structure by element substitution or compositional change each contain two lithium ions in one composition formula, so that high capacity can be expected theoretically. (Refer to Patent Literatures 7 to 11 and Non-Patent Literature 2.) Since each of these oxides has significantly low electron conductivity an attempt to coat the oxide grains with carbon has been made in addition to mixing the oxide with the electrically conductive auxiliary in an electrode. (Refer to Non-Patent Literatures 3 to 5.)

Related Art Literatures

Patent Literatures

Patent Literature 1: Published Patent Application JP 2003-34534 A
Patent Literature 2: Published Patent Application JP 2006-302671 A
Patent Literature 3: Published Patent Application JP 2002-75364 A
Patent Literature 4: Published Patent Application JP 2003-272632 A
Patent Literature 5: Published Patent Application JP 2004-234977 A
Patent Literature 6: Published Patent Application JP 2003-59491 A
Patent Literature 7: Published Patent Application JP 2007-335325 A
Patent Literature 8: Japanese Translation of PCT international Application JP 2005-519451 A
Patent Literature 9: Published Patent Application JP 2001-266882 A
Patent Literature 10: Published Patent Application JP 2010-106678 A
Patent Literature 11: Published Patent Application JP 2009-170401 A Non-Patent Literatures Non-Patent Literature 1: J. Moskon, R. Dominko, R. Cero-Korosec, M. Gaberscek, J. Jamnik, *J. Power Sources,* 174, (2007) 638-688.
Non-Patent Literature 2: R. Dominko, M. Bele, M. Gaberscek, A. Meden, M. Remskar, J. Jamnik, *Electrochem. Commun.,* 8, (2006) 217-222,
Non-Patent Literature 3: Bin SHAO, Izumi. TANIGUCHI, *Proceedings of The* 50*th Battery Symposium*, (2009) 111.
Non-Patent Literature 4: Bin SHAO, Izumi TANIGDCHI, *Proceedings of The* 51*st Battery Symposium*, (2016) 211.
Non-Patent Literature 5: Yi-Xiao Li, Zheng-Liang Gong, Yong Yang, *J. Poster Sources,* 174, (2007) 658-832, Non-Patent Literature 6: Akira KOJIMA, Toshikatsu KOJIMA, Takuhiro MIYUKI, Yasue OKUMURA, Tetsuo SAKAI, *Proceedings of The 51st Battery Symposium*, (2010) 194.

Non-Patent Literature 7: Yuichi KAMIMURA, Eiji KOBAYASHI, Takayuki DOI, Shigeto OKADA, Jun-ichi TAMAKI, *Proceedings of The 50th Battery Symposium*, (2009) 30.

SUMMARY OF THE INVENTION

Problems to be Solved by the Invention

As described above, in lithium iron silicate $Li_2FeSiO_4$, lithium manganese silicate $Li_2MnSiO_4$, and derivatives obtained from, these as the basic structure by element substitution or compositional change, high capacity (330 mAh/g) can be expected theoretically or compositionally. In reality, however, not many reports have described achievement of an actual capacity of 1 Li (165 mAh/g) or more, and no report has described achievement of an actual capacity of 1.5 Li (247 mAh/g) or more. The capacity described, in Patent Literature 7 is 60 to 130 mAh/g, and the actual capacities described in Non-Patent Literatures 6 and 7 are 190 mAh/g and 225 mAh/g, respectively.

Such high capacity cannot be obtained with any of lithium iron silicate $Li_2FeSiO_4$, lithium manganese silicate $Li_2MnSiO_4$, and derivatives thereof unless they each are made of fine grains of less than 1 μm. This is because a diffusion path of $Li^+$ ions and electrons needs to be short due to materials of these having low conductivity.

As described above, high, capacity can be obtained if they each are made of nano-size fine grains. However, a problem has been found in the case of nano-size fine grains that application performance is not good in a process of making the fine grains into a slurry and applying the slurry to a current collector to produce a cathode of a lithium ion secondary battery. For example, a crack(s) is generated in the application process or a drying process. Generation, of the crack is striking when a large amount of the slurry is applied.

The present invention has been conceived in view of the problem, and objects are to provide: a cathode material, for lithium ion secondary batteries, having a composite grain(s) composed of an oxide containing, as constituent elements, Li, Si and at least one of Fe and Mn and a carbon material, the cathode material with which high discharge capacity and excellent application performance are obtained; a cathode member for lithium ion secondary batteries and a lithium ion secondary battery each of which uses the cathode material for lithium ion secondary batteries; and a method for producing the cathode material for lithium ion secondary batteries.

Means for Solving the Problems

The present inventors have found, out that high capacity can be obtained if lithium iron, silicate $Li_2FeSiO_4$, lithium manganese silicate $Li_2MnSiO_4$, and derivatives obtained from, these as the basic structure by element substitution or compositional change each are made of fine grains which are less than 1 μm and as small as possible, but then the above-described problem in application performance occurs, whereas the problem in application, performance hardly occurs if the grains are grown to be 1 μm or more, but then high capacity cannot be obtained.

Then, the present inventors have found out that excellent application, performance can be obtained with a composite grain(s) having a certain size, the composite grain containing: an oxide having a composition of such as lithium iron silicate or lithium manganese silicate; and a carbon material. The present inventors have also found out that sufficiently high capacity is shown with the oxide observed that a diffraction peak exists within a certain range of an X-ray diffraction pattern and the diffraction peak is broad having a certain half width or more.

Further, the present inventors have found out that the composite grain, which is composed of an oxide having the above-described diffraction peak and a carbon material, can be easily produced by pyrolyzing a solution in a state of being liquid droplets, the solution containing a compound(s) which contains constituent elements of lithium iron silicate or lithium manganese silicate and an organic compound which produces a carbon material, to react the compounds with each other. Thus, the present inventor have established a production method of the present invention.

That is, the present invention is summarized as follows.

(1) A cathode material for a lithium ion secondary battery being a composite grain including: an oxide including, as constituent elements, Li, Si and at least one of Fe and Mn; and a carbon material, wherein according to a measurement by an X-ray diffraction method using Cu-Kα as an X-ray source, a diffraction peak exists within a range of $2\theta=33\pm2°$ and a half width of the diffraction peak is 0.55° or more, and a size of the grain is 1 μm or more and 20 μm or less.

(2) The cathode material for a lithium ion secondary battery according to (1), wherein a void having a size of 200 nm or more exists inside the grain.

(3) The cathode material for a lithium ion secondary battery according to (2), wherein an abundance of the void is 20% or more and 80% or less in terms of an area rate in a section of the grain.

(4) The cathode material for a lithium ion secondary battery according to any one of (1) to (3), wherein inside of the grain shows a sea-islands structure in which the oxide is scattered like islands in the carbon material, and an average circle-equivalent diameter of the islands of the sea-islands structure is 3 nm or more and 10 nm or less.

(5) A cathode member for a lithium ion secondary battery, including a metal foil provided, with, a cathode layer including: the cathode material for a lithium ion secondary battery according to any one of (1) to (4); and a binder.

(6) A lithium ion secondary battery including the cathode material for a lithium, ion secondary battery according to any one of (1) to (4) or the cathode member for a lithium ion secondary battery according to (5).

(7) A method for producing the cathode material for a lithium ion secondary battery according to (1), including: pyrolyzing a solution in a state of being liquid droplets, the solution including: a compound including elements composing an oxide including Li, Si and at least, one of Fe and Mn as constituent elements; and an organic compound which produces a carbon, material, to react the compounds with each other; and using a grain obtained, through the reaction.

Advantageous Effects of the Invention

According to the present invention, a cathode material for lithium ion secondary batteries excellent in capacity and application performance can be provided. In addition, a cathode member for lithium ion secondary batteries and a lithium ion secondary battery having high actual capacity can be provided. Further, according to the present invention, the cathode material for lithium ion secondary batteries can be easily produced.

BRIEF DESCRIPTION OF DRAWINGS

FIG. 5 shows a schematic view of the internal structure of the composite grain shown in FIG. 4 and a TEM image of a rupture part thereof.

EMBODIMENT FOR CARRYING OUT THE INVENTION

A cathode material for lithium, ion secondary batteries of the present invention is a composite grain(s) composed of: an oxide containing, as constituent elements, Li, Si, and at least one of Fe and Mn; and a carbon material. The size of the grain is 1 μm or more and 20 μm or less. In addition, according to a measurement by an X-ray diffraction (XRD) method using Cu-Kα as an X-ray source, a diffraction peat exists within a range of $2\theta=33\pm2°$ and the half width of the diffraction peak is 0.55° or more.

Thereby, a remarkable effect of obtaining sufficiently high capacity and excellent application performance is obtained.

In the present invention, the grain is 1 μm or more, so that excellent application performance is obtained. Because the grain size is large, even dispersion of the cathode material, in an applied slurry is easy and the slurry's fluidity is excellent, so that spots by the application are hardly generated. When the shape of the grain is spherical, the slurry's fluidity is better, and the grain can be made into a slurry with a small amount of a solvent. Hence, the applied film shrinks, which occurs in the application process or the drying process, not much and evenly, and cracks are prevented, from being generated. In particular, when an application amount thereof is large, the effect is strikingly demonstrated. Herein, the "spherical" means that an aspect ratio of the grain is within a range of 1 to 1.1.

If the grain size is less than 1 μm, the application performance is bad. On the other hand, if the grain size is more than 20 μm, the surface of the applied film is rough, i.e. not uniform, caused by the grain, and a flat electrode layer having a thickness of several tens μm in particular cannot be produced.

Herein, the grain size is a circle-equivalent diameter of the projected areas of grains observed with a transmission electron microscope (TEM) or a scanning electron microscope (SEM).

Figure 1:
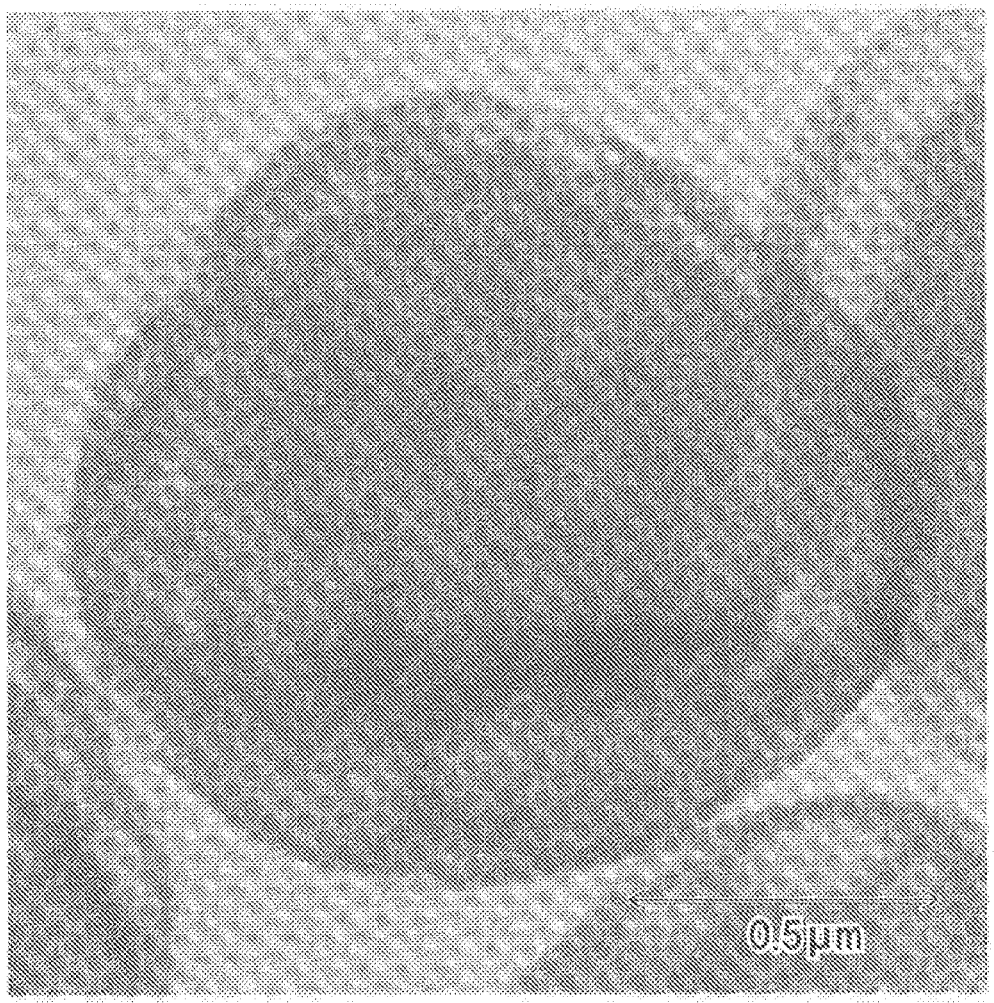
FIG. 1 shows a TEM image of a composite grain in the present invention.
Figure 2:
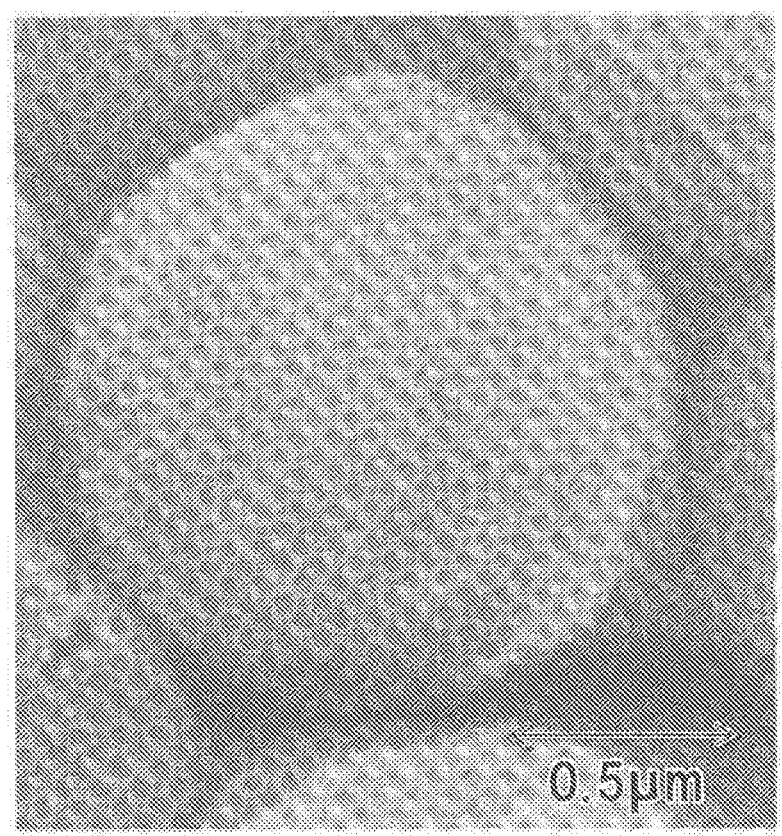
FIG. 2 shows an SEM image of the composite grain in the present invention.

FIG. 1 shows a typical example thereof observed with a TEM. FIG. 2 shows a typical example thereof observed with an SEM. The circle-equivalent diameter is calculated using a TEM image or an SEM image as follows; observed grains each are converted to the area of a circle, and the average value of the diameters of the circles is calculated. The circle-equivalent diameter is a number average value of 20 or more diameters thereof. In general, the circle-equivalent diameter is a number average value of 50 diameters thereof. When, either a TEM image or an SEM image is within the scope of the present, invention, the effect of the present invention is obtained.

The oxide in the present invention contains, as constituent elements, Li, Si, and at least one of Fe and Mn. The oxide is basically an oxide having the same composition ratio as that of an oxide represented by the composition formula $Li_2(Fe, Mn)SiO_4$, but crystallinity thereof is within a range described below.

For example, the oxide is an oxide having the same composition as that of $Li_2FeSiO_4$ or $Li_2MnSiO_4$ or an oxide having the same composition ratio as that of a derivative obtained from $Li_2FeSiO_4$ or $Li_2MnSiO_4$ as the basic structure by element substitution or compositional change. The oxide may be an oxide having a composition ratio obtained by substituting, for a part of Fe or Mn, another transition metal element (V, Ti, Co, Ni, Cu, Zn, Zr, Mg or the like). The oxide may be an oxide having a composition ratio obtained by substituting, for a part of Si, another element (B, Al, P, Ga, Ge, Mg or the like). The oxide may be an oxide having a composition ratio obtained by substituting, for a part of Li, another element (Na, K, Mg, Ca, Cu, Zn or the like). These composition, ratios may be modified in order to perform electric-charge compensation accompanying element substitution.

Further, the oxide may be an oxide having a composition ratio obtained by increasing Li content to more than 2, preferably an oxide having a composition ratio equivalent to a composition of an oxide represented by the composition formula $Li_{2+x}(Fe,M^A)(Si,M^B)O_4$ or $Li_{2+x}(Mn,M^A)(Si,M^B)O_4$ (wherein $M^A$ and $M^B$ represent elements substituted for Fe and Si, respectively, to compensate for an electric charge (s) equivalent to x of $Li^+$), wherein $0<x\leq0.25$.

Figure 3:
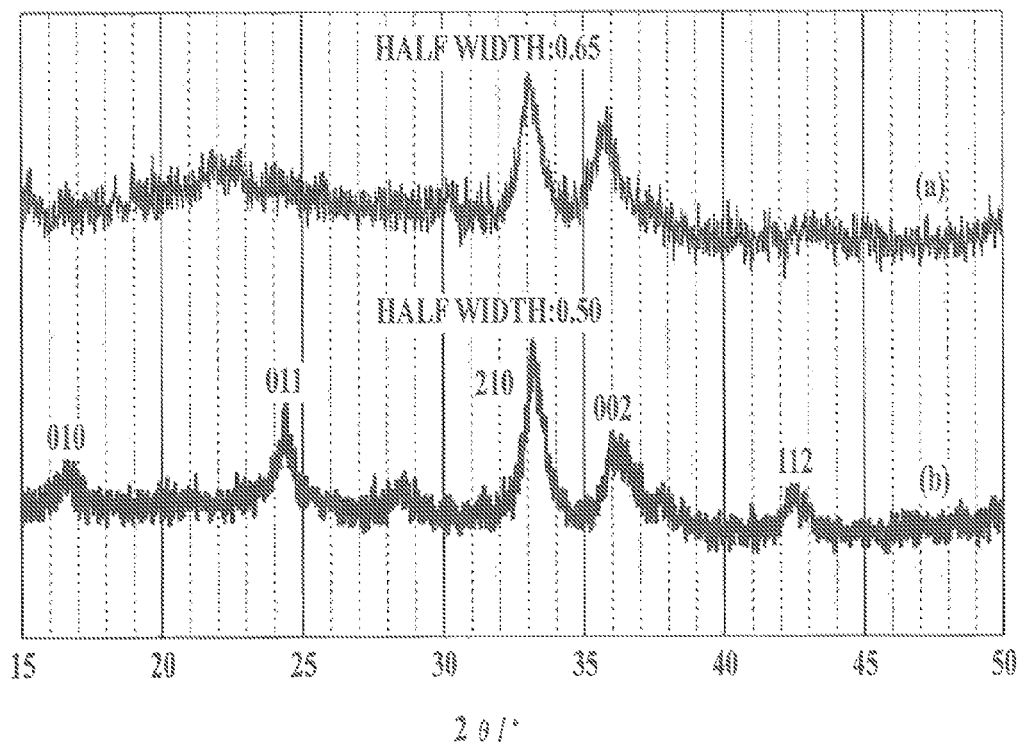
FIG. 3 shows XRD, wherein (a) is XRD of an oxide containing Li, Fe and Si in Li:Fe:Si=2:1:1 and is an example of a broad diffraction peaks, and (b) is XFD of an oxide composed of $Li_2FeSiO_4$ crystal and is an example of a sharp diffraction peak.

The oxide of the present invention has 0.55° or more as the half width, of the diffraction peak within the range of $2\theta=33\pm2°$ according to the measurement by the X-ray diffraction method using Cu-Kα as the X-ray source. FIG. 3 is a typical XRD graph, wherein (a) is obtained by subjecting the oxide of the present invention to the measurement, and (b) is obtained by subjecting a conventional one to the measurement. As the oxide of the present, invention, the half width of the diffraction peak within the range of $2\theta=33\pm2°$ is 0.53° or more, preferably with no diffraction peak acres ring within a range of $2\theta=15$ to 18°. In other words, the oxide of the present invention is an oxide having low crystallinity limited to a certain level.

In the oxide such as lithium iron silicate or lithium manganese silicate, the crystal regularity decreases (the crystal, structure is disturbed) through, the first charge ($Li^+$ ion deintercalation, i.e. delithiation), whereby the structure changes to a structure with which charge/discharge can be easily performed electrochemically. Thereby, the oxide acts as an active material. Thus, it is unnecessary for the oxide as the cathode active material to be lithium, iron silicate crystal, lithium manganese silicate crystal or the lire having high crystallinity as long as having a structure easily changeable to a structure with which charge/discharge can be easily performed. As described above, the crystal structure is disturbed through the first charge. Hence, low crystallinity is preferable, and in terms of the XRD diffraction peak, a certain broad diffraction peak (the half width of the peak is large) is preferable.

The upper limit of the half width is a half width calculated from a diffraction peak broad to the extent that the diffraction peak is observable and hence not particularly limited. However, in general, the range within which the diffraction peak exists, i.e. 4°, is considered to be the maximum. In terms of easily producing a sample having a broad diffraction peak, 2° may be considered to be the maximum.

Further, it is preferable that a void(s) having a size or 200 nm or more and less than the grain diameter exist in the composite grain.

Existence of the void in the composite grain makes high capacity possible even under a high discharge rate. This is because an electrolyte solution permeates the grain and a sufficient amount thereof can be kept in the void, so that even under a high rate, $Li^+$ ions can be easily transferred between the grain and the electrolyte solution inside the grain. On the other hand, if no void exists, an electrolyte solution cannot permeate the grain well and a sufficient amount thereof cannot reach the inside of the grain, so that $Li^+$ ions need to diffuse to the surface of the grain through the inside of the solid. Hence, efficient $Li^+$ ion intercalation/deintercalation under a high rate is impossible in some cases. That is, high capacity under a high rate is unavailable in some cases.

Figure 4:
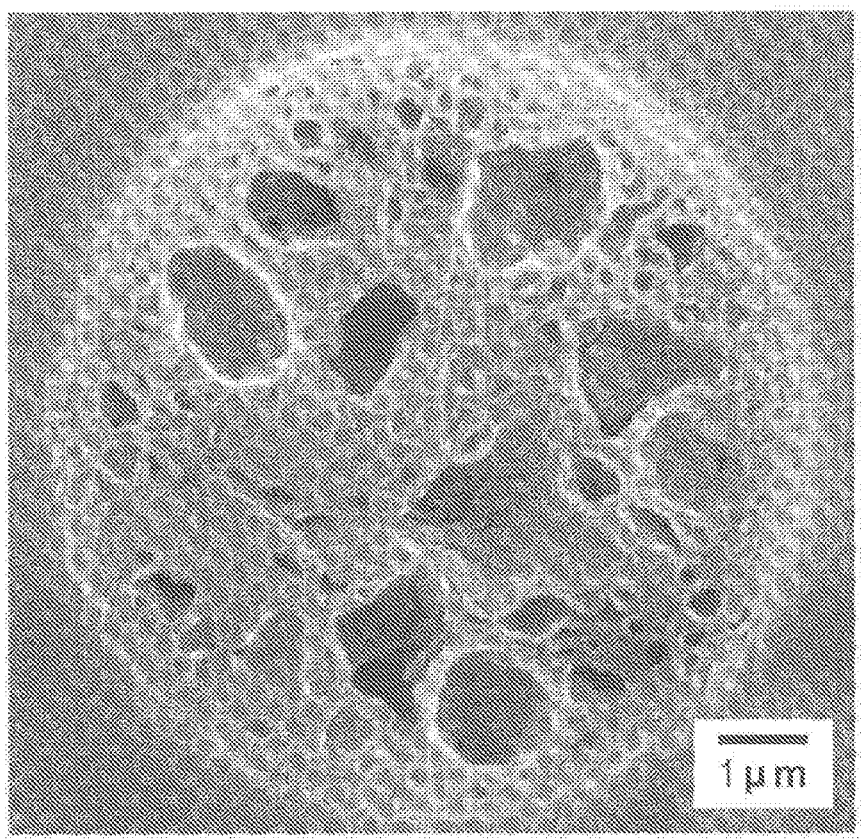
FIG. 4 shoos an SEM image of voids in the composite grain in the present invention.

Herein, the void size is a circle-equivalent diameter of the projected areas of voids observed when a section of the grain is observed with a scanning electron microscope (SEM). FIG. 4 shows a typical section of the grain observed with an SEM.

It is preferable that the abundance of the void be 20% or more and 80% or less in terms of an area rate in the section of the grain. The reason why the area rate is 20% or more and 80% or less is that if the area rate is less than 20%, high capacity under a high discharge rate is unavailable in some cases, whereas if the area rate is more than 80%, high capacity under a high discharge rate is available, but increase of the active material content in an electrode is difficult in some cases.

It is preferable that the inside of the composite grain show, as shown in FIG. 5, a sea-islands structure in which the oxide is scattered like islands in the carbon material, and an average circle-equivalent diameter of the islands of the sea-islands structure be 3 nm or more and 10 nm or less.

Inside the composite grain, a plurality of regions composed of the oxide such as lithium iron silicate or lithium manganese silicate exist. In other words, the composite grain has a structure in which the carbon material lies as a matrix (bulk) and the regions composed of the oxide are scattered (discrete). Hence, electron transfer to/from the regions, which occurs accompanying lithium ion intercalation/deintercalation to/from the regions, can be performed through the carbon material, so that ail the regions act as the active material. Thereby, high actual capacity can be realised. When the regions are small, the distance through which lithium ion diffusion in solid is performed is short and accordingly the actual capacity tends to be high. The electrical conductivity of the silicate oxide is very low. Hence, in order to obtain high actual capacity with a practical charge/discharge duration, the grain size needs to be equal to or less than the distance through which lithium ion diffusion in solid can be performed within the charge/discharge duration.

More specifically, when the circle-equivalent diameter of the projected areas of the regions composed of the oxide in the composite grain is 10 nm or less, higher actual capacity is obtained. If the diameter is more than 10 nm, the distance through which lithium ion diffusion in solid is performed is longer, and lithium ions cannot diffuse within the practical charge/discharge duration, so that high actual capacity is unavailable in some cases. The lower limit of the diameter is the minimum size down to which lithium ions can be easily kept in the oxide structure. That is, if the diameter is less than 3 nm, keeping lithium ions in the oxide structure is difficult in some cases.

The regions composed of the oxide in the composite grain are observable with a transmission electron microscope. The circle-equivalent diameter of the projected areas thereof can be calculated by observation with a transmission electron microscope and image processing.

More specifically, a transmission electron microscope image is subjected to thresholding, observed regions each are converted to the area of a circle, and the circle-equivalent diameter can be obtained by calculating the average value of the diameters of the circles. The circle-equivalent diameter is a number average value of 20 or more diameters thereof. In general, the circle-equivalent diameter is a number average value of 50 diameters thereof.

It is preferable that the carbon material content be 2 mass % or more and 25 mass % or less in the cathode material for lithium ion secondary batteries of the present invention.

If the carbon material content is less than 2 mass %, a sufficient electron conduction path to a current collector is impossible to secure in some cases, and hence excellent battery characteristics are unavailable in some cases. On the other hand, if the carbon material content is more than 25 mass %, the ratio of the active material content to a produced electrode is small, and hence high battery capacity is unavailable in some cases depending on the way or purpose of battery design. The above-mentioned range secures excellent battery characteristics easily and widens a range of selection of the battery design.

The carbon material in the present invention contains elemental carbon, and it is preferable that graphitic skeletal carbon content, which is included in the carbon material, in the composite grain be 20 to 70%. If the graphitic skeletal carbon content is less than 20%, the electrical conductivity of the carbon material decreases, and high capacity is difficult to obtain in some cases. On the other hand, if the graphitic skeletal carbon content is more than 70%, permeation of the electrolyte solution is difficult due to increased hydrophobicity, and high capacity is difficult to obtain in sores oases.

The cathode material for lithium ion secondary batteries of the present invention may be a cathode layer containing at least a binder, and the cathode layer is provided on the surface of a metal foil so that a cathode number for lithium ion secondary batteries is produced.

The binder (also referred to as a binding agent) serves to bind an active material and/or an electrically conductive auxillary.

The binder in the present invention is any of those generally used in producing cathodes of lithium ion secondary batteries. It is preferable that the binder be chemically and electrochemically stable against an electrolyte of a lithium ion secondary battery and a solvent of the electrolyte.

The binder is either of thermoplastic resin and thermosetting resin. Examples thereof include: polyolefin such as polyethylene and polypropylene; fluorine-containing resins such as polytetrafluoroethylene (PTFE), polyvinylidene fluoride (PVDF), tetrafluoroethylene-hexafluoroethylene copolymer, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, and vinylidene fluoride-perfluoromethyl vinyl ether-tetrafluoroethylene copolymer; styrene butadiene rubber (SBR); ethylene-acrylic acid copolymer and $Na^+$ ion crosslinked product of the copolymer; ethylene-methacrylic acid copolymer and $Na^+$ ion crosslinked product of the copolymer; ethylene-methyl acrylate copolymer and Na$^+$ ion crosslinked product of the copolymer; ethylene-methyl methacrylate copolymer and Na$^+$ ion crosslinked product of the copolymer; and carboxymethyl cellulose. Some of these may be used in combination. Among these materials, PVDF and PTFE are particularly preferable.

The binder is generally used in such a way as to be 1 to 20 mass % or around in the total amount of the cathode.

The cathode layer of the cathode member for lithium ion secondary batteries may further contain the electrically conductive auxillary.

Substantially, there is no special limitation on the electrically conductive auxiliary as long as it is an electron conductive material which is chemically stable. Examples thereof include carbon materials: such as graphites including natural graphite (flaky graphite, etc.) and synthetic graphite; acetylene black; Ketjen black; carbon blacks including channel black, furnace black, lamp black, and thermal black; and carbon fiber, and also include: electro-conductive fibers including metal fiber; carbon fluoride; metal powders of aluminum, etc.; zinc oxide; electro-conductive whiskers of potassium titanate, etc.; electro-conductive metal oxides including titanium oxide; and organic electro-conductive materials including polyphenylene derivative. One of these may be used alone, or two or more thereof may be used in combination. Among; these, carbon materials such as acetylene black, Ketjen black, and carbon black are particularly preferable.

The electrically conductive auxiliary is generally used in such a way as to be 1 to 25 mass % or around in the total amount of the cathode.

The cathode layer contains at least the cathode active material and the binder and has a structure having a void(s) which an electrolyte solution can enter. The cathode layer may contain the electrically conductive auxiliary in addition to the cathode active material and the binder.

The metal foil is an electro-conductive metal foil, and a foil made of aluminum, aluminum alloy or the like may be used therefor. The thickness thereof may be 5 μm to 50 μm.

The cathode member for lithium ion secondary batteries is used to produce a lithium ion secondary battery. For example, a lithium ion secondary battery is composed of at least an anode, a separator, and a non-aqueous electrolyte solution in addition to the cathode member, for lithium ion secondary batteries.

The anode contains a binder (also referred to as a binding agent) as needed in addition to an anode active material.

The anode active material of the anode is any material which allows metallic lithium or lithium ion doping/de-doping. Examples of the material which allows lithium ion doping/de-doping include carbon materials such as graphite, pyrolytic carbons, cokes, glassy carbons, sintered product of organic polymer compound, mesocarbon microbead, carbon fiber, and activated carbon. Also compounds including; alloys of Si, Sn, In, etc.; oxides of Si, Sn, Ti, etc. capable of charge/discharge at a low potential which is equivalent to that of Li; and nitride of Li and Co such as $Li_{2.6}Co_{0.4}N$ are usable as the anode active material. Metal capable of being alloyed with Li, an oxide or the like may be substituted for a part of graphite.

When graphite is used as the anode active material, the voltage in full-charge can be assumed to be approximately 0.1 V with reference to Li, so that the potential of the cathode can be calculated for convenience by adding 0.1V to the battery voltage. Hence, graphite is preferable for easy control of the charging potential of the cathode.

The anode may be configured to have an anode layer which contains the anode active material and the binder and is provided on the surface of a metal foil which serves as a current collector.

The metal foil is, for example, a foil of: a simple substance of copper, nickel or titanium; an alloy of any of these; or stainless steel. Preferably used materials for the anode current collector in the present invention include copper and an alloy thereof. Preferable metals capable of being alloyed with cooper include Zn, Ni, Sn, and Al. A small amount of Fe, P, Pb, Mn, Ti, Cr, Si, As or the like may be added thereto.

The separator is any insulating thin film having high ion permeability and a certain level of mechanical strength. Materials used for the separator include olefinic polymer, fluorine-containing polymer, cellulosic polymer, polyimide, nylon, glass fiber, and alumina fiber. Forms used for the separator include non-woven, fabric, woven fabric, and micro-porous film.

In particular, polypropylene, polyethylene, mixture of polypropylene and polyethylene, mixture of polypropylene and polytetrafluoroethylene (PTFE), and mixture of polyethylene and polytetrafluoroethylene (PTFE) are preferable materials therefor, and the micro-porous film is a preferable form therefor.

In particular, the micro-porous film having a pore diameter of 0.01 to 1 μm and a thickness of 5 to 50 μm is preferable. The micro-porous film may be a single film or may be a composite film composed of two or more layers having different properties, for example, in pore geometry, pore density and/or material. A composite film configured by bonding a polyethylene film and a polypropylene film is an example thereof.

The non-aqueous electrolyte solution is generally composed of an electrolyte (supporting salt) and a non-aqueous solvent. The supporting salt mainly used for the lithium secondary battery is lithium salt.

Examples of the lithium salt usable in the present invention include $LiClO_4$, $LiBF_4$, $LiPF_6$, $LiCF_3CO_2$, $LiAsF_6$, $LiSbF_6$, $LiB_{10}Cl_{10}$, fluorosulfonate salt represented by $LiOSO_2C_2F_{2n+}$ (n represents a positive integer of 6 or less), imide salt represented by $LiN(SO_2C_nF_{2n+1})(SO_2C_mF_{2m+1})$ (each of m and n independently represents a positive integer of 6 or less), methide salt represented by $LiC(SO_2C_pF_{2p+1})(SO_2C_qF_{2q+1})(SO_2C_rF_{2r+1})$ (each of p, q and r independently represents a positive integer of 6 or less), and Li salt such as lower aliphatic carboxylate lithium, $LiAlCl_4$, LiCl, LiBr, LiI, chloroborane lithium, and lithium tetraphenylborate. One of these may be used alone, or two or more thereof may be used in a mixed manner. Among them, $LiBF_4$ and/or $LiPF_6$ being dissolved is preferable.

It is preferable that the concentration of the supporting salt be 0.2 to 3 mol per liter of an electrolyte solution although not particularly limited.

Examples of the non-aqueous solvent include; aprotic organic solvents such as propylene carbonate, ethylene carbonate, butylene carbonate, chloroethylene carbonate, trifluoromethyl ethylene carbonate, difluoromethyl ethylene carbonate, monofluoromethyl ethylene carbonate, hexafluoromethyl acetate, trifluoromethyl acetate, dimethyl carbonate, diethyl carbonate, methylethyl carbonate, γ-butyrolactone, methyl formate, methyl acetate, 1,2-dimethoxyethane, tetrahydrofuran, 2-methyltetrahydrofuran, dimethylsulfoxide, 1,3-dioxolane, 2,2-bis(trifluoromethyl)-1,3-dioxolane, formamide, dimethyl formamide, dioxolane, dioxane, acetonitrile, nitromethane, ethyl monoglyme, phosphoric triester, boric triester, trimethoxymethane, dioxolane derivative, sulfolane, 3-methyl-2-oxazolidinone, 3-alkylsydnone (the alkyl group is propyl group, isopropyl group, butyl group, etc.), propylene carbonate derivative, tetrahydrofuran derivative, ethyl ether, and 1,3-propane sultone; and ionic liquid. One of these may be used alone, or two or more thereof may be used in a mixed manner.

Among them, the carbonate-based solvents are preferable, and it is particularly preferable to use cyclic carbonate and acyclic carbonate in a mixed manner. As cyclic carbonate, ethylene carbonate and propylene carbonate are preferable. As acyclic carbonate, diethyl carbonate, dimethyl carbonate, and methylethyl carbonate are preferable. The ionic liquid is preferable from the viewpoint of wide electrochemical window and heat resistance.

It is preferable that the electrolyte solution contain $LiCF_3SO_3$, $LiClO_4$, $LiBF_4$ and/or $LiPF_6$ dissolved in an electrolyte solution prepared by appropriately mixing some of ethylene carbonate, propylene carbonate, 1,2-dimethoxyethane, dimethyl carbonate, and diethyl carbonate.

In particular, it is preferable that the electrolyte solution contain $LiPF_6$ and at least one salt selected from $LiCF_3SO_3$, $LiClO_4$, and $LiBF_4$ in a mixed solvent of at least one of propylene carbonate and ethylene carbonate and at least one of dimethyl carbonate and diethyl carbonate.

The amount of addition of the electrolyte solution to the battery is not particularly limited, and hence an appropriate amount thereof can be used according to the amount of the cathode material and/or the anode material, and to the size of the battery.

Besides the electrolyte solution, a solid electrolyte described below may be used. The solid electrolyte is classified into an inorganic solid electrolyte and an organic solid electrolyte.

Examples of the inorganic solid, electrolyte include nitride, halide, and oxysalt of Li. Among them, effective are $Li_3N$, $LiI$, $Li_5NI_2$, $Li_3N$—$LiI$—$LiOH$, $Li_4SiO_4$, $Li_4SiO_4$—$LiI$—$LiOH$, $_xLi_3PO_4$—$_{(1-x)}Li_4SiO_4$, $Li_2SiS_3$, phosphorus sulfide compound (for example, $Li_{10}GeP_2S_{12}$) and so forth.

Effective examples of the organic solid electrolyte include polyethylene oxide derivative, polymer containing such derivative; polypropylene oxide derivative, polymer containing such derivative; polymer containing ion dissociative group; mixture of polymer containing ion dissociative group and the above aprotic electrolyte solution; phosphoric ester polymer; and polymer matrix material impregnated with an aprotic polar solvent. Polyacrylonitrile may be added to an electrolyte solution. It is also known to use the inorganic and organic solid electrolytes in combination.

A lithium ion secondary battery can be produced using the material for lithium ion secondary batteries without producing the member for lithium ion secondary batteries. For example, a lithium ion secondary battery is composed of: a cathode configured, by forming, on a metal mesh, a cathode layer which contains the material for lithium ion secondary batteries, an electrically conductive auxiliary, and a binder; an anode; a separator; and a non-aqueous electrolyte solution.

Examples of a method for producing a cathode material for lithium ion secondary batteries of the present invention is described below.

First, the production method using a spray pyrolysis method is described as an example.

A source material(s) used in the spray pyrolysis method is a compound(s) which contains elements composing a desired oxide and is soluble in water or an organic solvent. The solution in which the compound and an organic compound which produces a carbon material are dissolved is converted into liquid droplets using an ultrasonic wave or a nozzle (a one fluid nozzle, a two fluid nozzle, a four fluid nozzle, etc.). Then, the liquid droplets are introduced into a heating furnace of 500 to 1000° C. to be pyrolyzed. Thus, a grain(s) of the present invention can be produced. Thus, the grain can be easily produced through a small number of steps. The temperature of the heating furnace is a temperature at which the grain having a diffraction peak existing within a range of $2\theta=33\pm2°$ according to a measurement by an X-ray diffraction method using Cu-Kα as a X-ray source can be produced, preferably a temperature at which the half width of the diffraction peak is not less than 0.55°.

The grain may further be subjected to heat treatment in an inert atmosphere or a reductive atmosphere at 300° C. or above and 0.757 Tm of a melting point Tm (Kelvin, K) or below.

As the temperature of the heat treatment, a temperature for no significant grain growth (a temperature at or below which surface diffusion occurs) is preferable. In particular, a temperature for no crystallinity increase is further preferable. In other words, it is further preferable that the heat treatment be performed, in such a way that the half width of the diffraction peak within the range of $2\theta=33\pm2°$ of the XRD pattern is not more than 4.00° and not less than 0.55°.

The grain which satisfies the requirements of the present invention can be produced by appropriate adjustment of the amount of the organic compound, which produces a carbon material, and the temperature for spray pyrolysis. The diameter of the grain is controllable by appropriate adjustment of the size of the liquid droplets and the concentration of the solution to spray.

As a specific case, for example, lithium nitrate, iron (III) nitrate nonahydrate, and colloidal silica are weighted in snob a way as to be a chemical composition of Li:Fe:Si=2:1:1 in a mole ratio and dissolved in water. Glucose is added to the solution, in which the compounds are dissolved, in such a way as to be Li:Fe:Si:glucose=2:1:1:2 in a mole ratio, and, for example, the resulting solution is converted into liquid droplets using an ultrasonic atomiser, and the liquid droplets are introduced together with nitrogen gas as a carrier gas into a heating furnace of 800° C. to be pyrolyzed. Thus, the grain can be produced.

As another specific case, for example, lithium nitrate, manganese (II) nitrate hexahydrate, and tetraethoxysilane are weighted in such a way as to be a chemical composition of Li:Mn:Si=2:1:1 in a mole ratio and dissolved in water. Tetraethoxysilane is dissolved in methoxyethanol in advance, and this solution is dissolved in the wafer. Glucose is added to the solution, in which the compounds are dissolved, in such a way as to be Li:Mn:Si:glucose=2:1:1:2 in a some ratio, and, for example, the resulting solution is converted into liquid droplets using an ultrasonic atomiser, and the liquid droplets are introduced together with nitrogen gas as a carrier gas into a heating furnace of 600° C. to be pyrolyzed. Thus, the grain can be produced.

Next, the production method using a roasting method is described as an example.

A source material(s) used in the roasting method is a compound(s) which contains elements composing a desired metal oxide and is soluble in water. When the metal oxide contains iron as an element, it is preferable to use for the source material an iron, and steel pickling waste liquid or an aqueous solution, prepared by dissolving a rolling scale in hydrochloric acid. The aqueous solution in which the compound is dissolved is introduced into a roasting furnace of the Ruthner type, Lurgi type, Chemirite type or the like to be pyrolyzed. Thus, the grain can be produced.

The grain which satisfies the requirements of the present invention can be produced by appropriate adjustment of the amount of the organic compound, which, produces a carbon material, and the temperature for pyrolysis in the roasting furnace. The diameter of the grain is controllable by appropriate adjustment of the site of the liquid droplets and the concentration of the solution to spray.

The grain may further be subjected to heat treatment in an inert atmosphere or a reductive atmosphere at 300° C. or above and 0.757 Tm of the melting point Tm (K) or below.

As the temperature of the heat treatment, a temperature for no significant grain growth (a temperature at or below which surface diffusion occurs) is preferable. In particular, a temperature for no crystallinity increase is further preferable. In other words, it is further preferable that the heat treatment be performed in such a way that the half width of the diffraction peak within the range of $2\theta=33\pm2°$ of the XRD pattern is not more than 4.00° and not less than 0.55°.

As a specific case, for example, lithium acetate, manganese (II) nitrate hexahydrate, and colloidal silica are weighted in such a way as to be a chemical composition of Li:Mn:Si=2:1:1 in a mole ratio and dissolved in water. Glucose is dissolved in the aqueous solution, in which the compounds are dissolved, in such a way as to be Li:Mn:Si:glucose=2:1:1:2 in a mole ratio, and the resulting solution is, for example, introduced into a Chemirite type roasting furnace to be pyrolyzed at 500 to 800° C. Thus, the grain can be produced.

As another specific case, for example, lithium carbonate and colloidal silica, are dissolved in an iron and steel pickling waste liquid (for example, hydrochloric acid waste liquid with a concentration of 0.6 mol (Fe)/L) to be prepared, in such, a way as to be a concentration equivalent to a chemical composition ratio of Li:Fe:Si=2:1:1 in a mole ratio. In order to fully dissolve lithium carbonate, an appropriate amount of 18% hydrochloric acid is added to the iron and steel pickling waste liquid in advance. Glucose is dissolved in the aqueous solution, in which the compounds are dissolved, in such a way as to be Li:Fe:Si:glucose=2:1:1:2 in a mole ratio, and the resulting solution is, for example, introduced into a Ruthner type roasting furnace to be pyrolyzed at 500 to 800° C. Thus, the grain can be produced.

Examples of the organic compound, which produces the carbon material, include ascorbic acid, monosaccharides (glucose, fructose, galactose, etc.), disaccharides (sucrose, maltose, lactose, etc), polysaccharides (amylase, cellulose, dextrin, etc.), polyvinyl alcohol, polyethylene glycol, polypropylene glycol, polyvinyl butyral, polyvinyl pyrrolidone, phenol, hydroquinone, catechol, maleic acid, citric acid, malonic acid, ethylene glycol, triethylene glycol, diethylene glycol butyl methyl ether, triethylene glycol butyl methyl ether, tetraethylene glycol, dimethyl ether, tripropylene glycol dimethyl ether, and glycerin.

Examples of the compound, which contains elements composing the oxide, include metal, hydroxide, nitrate, chloride, organic acid salt, oxide, carbonate, and metal alkoxide.

EXAMPLES

First Example

Starting materials used were lithium nitrate ($LiNO_3$), iron (III) nitrate nonahydrate ($Fe(NO_3)_3 \cdot 9H_2O$), tetraethoxysilane (hereinafter TEOS), and aluminum sec-butoxide. The materials were dissolved in water in such a way as to be each composition ratio shown in Table 1-1, so that, aqueous solutions were prepared.

TEOS was dissolved in methoxyethanol in advance, and this solution was dissolved in the water. When aluminum sec-butoxide was used, aluminum sec-butoxide chemically modified with ethyl acetoacetate was added to the methcoxyethanol, in which TEOS was dissolved, to be dissolved therein, and the resulting solution was dissolved in the water. Further, glucose as the organic compound, which produces a carbon material, was added to the aqueous solutions. Each of these aqueous solutions was subjected to spray pyrolysis in a heating furnace heated at 400 to 1100° C. using a carrier gas coops set of nitrogen gas. Thereby, samples were produced.

The solutions each were prepared in such a way that the concentration of metal, ions, Fe ions, in the solution was within a range of 0.05 to 0.9 mol/L. The glucose was added in such a way that a mole ratio of glucose/oxide was within a range of 0.5 to 4. If a mole ratio of glucose/oxide is 0.5 or less, the added glucose hardly remains as carbon in the gram, and even if the added amount of glucose is more than that, the glucose dose not remain as carbon in the grain when the heating temperature is high.

The crystallinity (half width) was controlled through the added amount of glucose and the temperature of the furnace. The more the remaining carbon is, the harder the crystal growth is and accordingly the lower the crystallinity is. The lower the temperature of the furnace is, the harder the crystal growth is and accordingly the lower the crystallinity is. The grain size was controlled through the concentration of metal ions in the liquid droplets and the glucose content.

Sample 1-5 was produced by subjecting Sample 1-1 to heat treatment at 700° C. for 3 hours in 1% $H_2$/Ar. Sample 1-6 was produced by subjecting Sample 1-1 to heat treatment at 600° C. for 3 hours in 1% $H_2$/Ar. Sample 1-7 was produced by subjecting Sample 1-1 to wet grinding and then granulation during spray-drying. Sample 1-9 was produced by subjecting Sample 1-1 to wet grinding and then freeze-drying for no granulation. Sample 1-11 was produced by spray pyrolysis in the heating furnace heated at 400° C., and the other samples were produced by spray pyrolysis therein heated at 500° C. or above.

The temperature of the spray furnace (the temperature of the heating furnace), the added amount of glucose, and the concentration of metal ions in the solution regarding each sample are shown in Table 1-1.

<Analysis of Individual Samples>

The individual Samples 1-1 to 1-23 obtained as described above were analyzed as follows.

Samples 1-1 to 1-23 were subjected to an X-ray diffraction measurement, using a powder X-ray diffractometer (Ultima II manufactured by Rigaku Corporation). As an X-ray source, Cu-Kα line (λ=1.5405 Å) was used, and the measurement was performed in accordance with JIS K0131. Because Sample 1-11 was produced by spray pyrolysis at a low temperature of 400° C., no diffraction peak appeared within $2\theta=33\pm2°$. In the other samples, the diffraction peak existed within the range. Regarding each of the samples except for Sample 1-11, the half width (full, width at half maximum, i.e. FWHM) of the diffraction peak within $2\theta=33\pm2°$ was determined.

Samples 1-1 to 1-23 were observed under a transmission electron microscope (H-9000UHR III manufactured by Hitachi Ltd.). Because Samples 1-2 and 1-3 each, did not contain the carbon material and accordingly were not a composite grain(s), the sea-islands structure was not observed therein, whereas the sea-islands structure was observed, in the other samples. The circle-equivalent diameter of the islands (oxide) of each of Samples 1-1 and 1-4 to 1-23 was calculated using the method described above. The obtained circle-equivalent diameter of each sample is shown in Table 1-1.

The grains were observed under a scanning electron microscope (JSM-7000F manufactured by JEOL Ltd.), and the circle-equivalent diameter was calculated as the grain size using the images. Samples 1-1 to 1-8 and 1-10 to 1-23 had the values shown in the "Grain Size" column in Table 1-2. Sample 1-9 was produced by grinding Sample 1-1 to be a size of 0.2 µm, so that Sample 1-9 was a nonuniformity-shaped fine grain(s) having the mentioned size, not a spherical grain (s). Sample 1-7 was produced by grinding Sample 1-1 and then granulating, so that the size thereof was the size of a spherically-granulated grain(s). The grains were observable under a transmission electron microscope too. The obtained values of the grain size using a transmission electron microscope were the same as those shown therein.

Sections of Samples 1-1 to 1-8 and 1-10 to 1-23, which were the grains, were also observed under a scanning electron microscope. Using the images, a void(s) of 200 nm or more in the grains was picked, and the area rate was calculated as the abundance of the void. Samples 1-1 to 1-6, 1-8, and 1-10 to 1-23 had the values shown in the "Area Rate" column of the "Void in Grain" column in Table 1-2. Sample 1-7 was produced by grinding Sample 1-1 and then granulating, so that the inside of the grain was dense, and no large void such as a void of 200 nm or more existed.

The carbon material content in each sample was determined using a carbon/sulfur analyzer EMIA-320V manufactured by Horiba Ltd. and is shown in the "Carbon Content" column in Table 1-2. Sample 1-2 was produced by reducing the added amount of glucose so as not to leave carbon. If a mole ratio of glucose/oxide is 0.5 or less, no carbon remains, whereas if the mole ratio thereof is more than that, carbon remains. Sample 1-3 was produced by spray pyrolysis in the furnace of a high temperature of 1100° C. so as not to leave carbon.

<Evaluation of Application Performance>

The application performance of each of Samples 1-1 to 1-23 shown in Table 1-2 was obtained as follows.

Into a dispersion medium (N-methylpyrrolidone, i.e. NMP), 90 mass % of a sample, 4 mass % of polyvinylidene difluoride (PVDF), and 6 mass % of acetylene black were mixed to prepare a slurry. The slurry was applied onto a 20 µm thick aluminum foil, using a Baker-type applicator in which a clearance was set at 300 µm and dried using a dryer of 100° C. The surface of the dried applied film was visually observed. Samples having conspicuous surface roughness or a crack(s) were evaluated as "bad application performance: x", and samples having flat surface and no crack were evaluated, as "excellent application performance: o".

As shown, in Table 1-2, Samples 1-1 to 1-3, 1-5 to 1-6, 1-8, and 1-10 to 1-23 had no crack to be seen, and hence their application performance was excellent. Sample 1-4 had a grain size of less than 1 µm, and accordingly, when the applied film was dried, a crack(s) was generated, and hence excellent application performance was not obtained. Sample 1-7 had a grain size which is too large, so that there was a problem in surface roughness caused by the grain. Sample 1-9 was a ground grain(s) and consequently was a no-spherical fine grain(s) of less than 1 µm, and accordingly, when the applied film was dried, a crack(s) was generated, and hence excellent application performance was not obtained.

<Evaluation of Discharge Characteristics>

Trial batteries were produced by using Samples 1-1 to 1-23 for cathodes and metallic lithium for anodes with non-aqueous electrolyte solutions and evaluated. The electrode sheets, which were produced by the above-described application onto aluminum foils, were stamped out to be 16 mmφ and used for the cathodes. The mass of each sample was calculated by subtracting the mass of the stamped-out aluminum foil from the mass of the 16 mmφ stamped-out cathode plate and using the above-mentioned mixture mass ratio. The mass of the active material was calculated by excluding the carbon content in each sample therefrom.

For the anodes, 500 µm thick metallic lithium foils were used, and for anode current collectors, 20 µm thick nickel foils were used.

As each of the electrolyte solutions, a non-aqueous electrolyte solution composed of 1.0 mol/L $LiPF_6$ dissolved in a mixed solvent of ethyl carbonate and dimethyl carbonate mixed in a volume ratio of 1:2 was used, and as each of separators, 25 µm thick porous polypropylene was used. CR2032 type coin batteries were assembled in an argon-filled glove box by using these.

Five coin batteries were produced using each sample, and the produced coin batteries were subjected to a charge/discharge test in a thermostat chamber of 25° C. to measure the initial discharge capacity. In the charge/discharge test, preliminary charge-and-discharge was repeated four times under a CC-CV condition over a voltage range of 1.5 to 5.0 V at a rate of 0.1 C, and thereafter charge was performed under the CC-CV condition at a rate of 0.2 C and 2.0 C to 250 mAh/g, and the discharge capacity was measured to obtain the initial discharge capacity and the initial discharge capacity under a high rate, respectively. The initial discharge capacity of the five coin batteries of each sample was measured. The average value of the obtained values of each initial discharge capacity of three coin batteries without those having the maximum value and the minimum value is the value of each initial discharge capacity shown in Table 1-2. The discharge capacity at 2 V in the initial discharge curve is also shown in the "Discharge Capacity at 2 V (Fifth Discharge)" column in Table 1-2.

Samples 1-1, 1-4, 1-6, 1-8 to 1-10, and 1-12 to 1-23 each showed a high initial discharge capacity of 190 mAh/g or more. Among them, Samples 1-4 and 1-9 were not those to obtain excellent application performance although showed such high initial discharge capacity.

TABLE 1-1

| | OXIDE | | | | | | | | |
|---|---|---|---|---|---|---|---|---|---|
| | COMPOSITION (MOLE RATIO) | | | | HALF WIDTH OF XRD PEAK | CIRCLE-EQUIVALENT DIAMETER | TEMPERATURE OF SPRAY FURNACE | ADDED AMOUNT OF GLUCOSE MOLE RATIO | CONCENTRATION OF METAL ION OXIDE |
| No. | Li | Fe | Si | Al | [°] | [nm] | [° C.] | (GLUCOSE/OXIDE) | mol/L |
| 1-1 | 2 | 1 | 1 | — | 0.80 | 6 | 800 | 2 | 0.31 |
| 1-2 | 2 | 1 | 1 | — | 0.60 | — | 800 | 0.5 | 0.31 |
| 1-3 | 2 | 1 | 1 | — | 0.55 | — | 1100 | 2 | 0.31 |
| 1-4 | 2 | 1 | 1 | — | 0.80 | 5 | 800 | 2 | 0.1 |
| 1-5 | 2 | 1 | 1 | — | 0.50 | 15 | HEAT TREATMENT OF 1-1 AT 700° C. FOR 1 h. | 2 | 0.31 |

TABLE 1-1-continued

| | OXIDE | | | | | | | |
|---|---|---|---|---|---|---|---|---|
| | COMPOSITION (MOLE RATIO) | | | HALF WIDTH OF XRD PEAK | CIRCLE-EQUIVALENT DIAMETER | TEMPERATURE OF SPRAY FURNACE | ADDED AMOUNT OF GLUCOSE MOLE RATIO | CONCENTRATION OF METAL ION OXIDE |
| No. | Li | Fe | Si | Al | [°] | [nm] | [° C.] | (GLUCOSE/OXIDE) | mol/L |
| 1-6 | 2 | 1 | 1 | — | 0.55 | 12 | HEAT TREATMENT OF 1-1 AT 600° C. FOR 3 h. | 2 | 0.31 |
| 1-7 | 2 | 1 | 1 | — | 0.80 | 5 | GRIND 1-1 AND GRANULATE | 2 | 0.31 |
| 1-8 | 2 | 1 | 1 | — | 0.75 | 5 | 800 | 2 | 0.9 |
| 1-9 | 2 | 1 | 1 | — | 0.85 | 6 | GRIND 1-1 | 2 | 0.31 |
| 1-10 | 2 | 1 | 1 | — | 1.20 | 3 | 500 | 3 | 0.31 |
| 1-11 | 2 | 1 | 1 | — | — | 2 | 400 | 3 | 0.31 |
| 1-12 | 2 | 1 | 1 | — | 0.60 | 10 | 850 | 2 | 0.4 |
| 1-13 | 2 | 1 | 1 | — | 0.85 | 5 | 800 | 1.5 | 0.31 |
| 1-14 | 2 | 1 | 1 | — | 0.90 | 4 | 800 | 4 | 0.31 |
| 1-15 | 2 | 1 | 1 | — | 0.60 | 10 | 900 | 2 | 0.31 |
| 1-16 | 2 | 1 | 1 | — | 0.60 | 10 | 1000 | 2 | 0.31 |
| 1-17 | 2 | 1 | 1 | — | 0.85 | 6 | 800 | 2 | 0.5 |
| 1-18 | 2 | 1 | 1 | — | 0.70 | 5 | 800 | 2 | 0.35 |
| 1-19 | 2 | 1 | 1 | — | 0.80 | 5 | 800 | 2 | 0.25 |
| 1-20 | 2 | 1 | 1 | — | 0.80 | 5 | 800 | 2 | 0.15 |
| 1-21 | 2 | 1 | 1 | — | 0.60 | 8 | 900 | 2 | 0.15 |
| 1-22 | 2.0625 | 1 | 0.9375 | 0.0625 | 0.75 | 6 | 800 | 2 | 0.31 |
| 1-23 | 2.125 | 0.0625 | 1 | — | 0.66 | 7 | 800 | 2 | 0.31 |

TABLE 1-2

| No. | CARBON CONTENT [mass %] | VOID IN GRAIN (200 nm OR MORE) | | GRAIN SIZE [μm] | INITIAL DISCHARGE CAPACITY (FIFTH DISCHARGE) [mAh/g, 0.2 C] | DISCHARGE CAPACITY AT 1 V (FIFTH DISCHARGE) [mAh/g, 0.2 C] | INITIAL DISCHARGE CAPACITY UNDER HIGH RATE (FIFTH DISCHARGE) [mAh/g, 2.0 C] | APPLICATION PERFORMANCE | REMARK |
|---|---|---|---|---|---|---|---|---|---|
| | | PRESENCE | AREA RATE [%] | | | | | | |
| 1-1 | 10 | YES | 40 | 5 | 215 | 150 | 155 | ○ | EXAMPLE |
| 1-2 | 0 | YES | 10 | 4 | 100 | 30 | 15 | ○ | COMPARATIVE EXAMPLE |
| 1-3 | 0 | YES | 40 | 5 | 90 | 20 | 15 | ○ | COMPARATIVE EXAMPLE |
| 1-4 | 11 | YES | 30 | 0.8 | 215 | 150 | 155 | X/CRACK | COMPARATIVE EXAMPLE |
| 1-5 | 10 | YES | 40 | 7 | 150 | 100 | 50 | ○ | COMPARATIVE EXAMPLE |
| 1-6 | 10 | YES | 40 | 7 | 200 | 130 | 135 | ○ | EXAMPLE |
| 1-7 | 10 | NO | — | 25 | 170 | 120 | 80 | X/SURFACE ROUGHNESS | COMPARATIVE EXAMPLE |
| 1-8 | 12 | YES | 40 | 20 | 210 | 145 | 150 | ○ | EXAMPLE |
| 1-9 | 10 | — | — | — | 190 | 135 | 130 | X/CRACK | COMPARATIVE EXAMPLE |
| 1-10 | 20 | YES | 20 | 6 | 220 | 160 | 150 | ○ | EXAMPLE |
| 1-11 | 15 | YES | 25 | 7 | 10 | 5 | 2 | ○ | COMPARATIVE EXAMPLE |
| 1-12 | 10 | YES | 45 | 7 | 210 | 145 | 145 | ○ | EXAMPLE |
| 1-13 | 5 | YES | 40 | 3 | 220 | 155 | 160 | ○ | EXAMPLE |
| 1-14 | 25 | YES | 20 | 9 | 215 | 155 | 150 | ○ | EXAMPLE |
| 1-15 | 2 | YES | 30 | 3 | 200 | 140 | 150 | ○ | EXAMPLE |
| 1-16 | 1 | YES | 30 | 2 | 190 | 130 | 130 | ○ | EXAMPLE |
| 1-17 | 13 | YES | 17 | 15 | 210 | 145 | 110 | ○ | EXAMPLE |
| 1-18 | 11 | YES | 30 | 2 | 220 | 158 | 153 | ○ | EXAMPLE |
| 1-19 | 8 | YES | 80 | 9 | 215 | 145 | 146 | ○ | EXAMPLE |
| 1-20 | 8 | YES | 90 | 7 | 215 | 144 | 156 | ○ | EXAMPLE |
| 1-21 | 4 | YES | 25 | 1 | 195 | 138 | 142 | ○ | EXAMPLE |
| 1-22 | 9 | YES | 45 | 3 | 230 | 170 | 165 | ○ | EXAMPLE |
| 1-23 | 10 | YES | 50 | 4 | 225 | 170 | 165 | ○ | EXAMPLE |

Second Example

Starting materials used were lithium nitrate (LiNO$_3$), manganese (II) nitrate hexahydrate (Mn(NO$_3$)$_2$.6H$_2$O), colloidal silica, aluminum nitrate nonahydrate (Al(NO$_3$)$_3$.9H$_2$O), and magnesium nitrate hexahydrate (Mg(NO$_3$)$_2$.6H$_2$O).

The materials were dissolved in water in such a way as to be each composition ratio shown in Table 2-1, so that aqueous solutions were prepared. Further, glucose as the organic compound, which produces a carbon material, was added to the aqueous solutions. Each of these aqueous solutions was subjected to spray pyrolysis in a heating furnace heated at 400 to 1100° C. using a carrier gas composed of nitrogen gas. Thereby, samples were produced.

The solutions each were prepared in such a way that the concentration of metal ions in the solution was within a range of 0.05 to 0.9 mol/L when the composition, of the oxide was converted to moles. The glucose was added in such a way that a mole ratio of glucose/oxide was within a range of 0.5 to 4. The crystallinity (half width) was controlled through the added amount of glucose and the temperature of the furnace. The more the remaining carbon is, the harder the crystal growth is and accordingly the lower the crystallinity is. The lower the temperature of the furnace is, the harder the crystal growth is and accordingly the lower the crystallinity is. The grain sire was controlled through the concentration of metal ions in the liquid droplets and the glucose content.

Sample 2-1 was produced by subjecting Sample 2-3 to heat treatment at 700° C. for 3 hours in 1% H$_2$/Ar. Sample 2-2 was produced by subjecting Sample 2-3 to heat treatment at 500° C. for 1 hour in 1% H$_2$/Ar. Sample 2-9 was produced by subjecting Sample 2-3 to wet grinding and then freeze-drying for no granulation. Sample 2-10 was produced by subjecting Sample 2-3 to wet grinding and then granulation during spray-drying. Sample 2-11 was produced by subjecting the granulated powder of Sample 2-10 to classification and grain size control. Sample 2-14 was produced by spray pyrolysis in the heating furnace heated, at 400° C., and the other samples were produced by spray pyrolysis therein heated at 500° C. or above.

The temperature of the spray furnace, the added amount of glucose, and true concentration of metal ions in the solution regarding each sample are shown in Table 2-1.

The individual Samples 2-1 to 2-21 obtained as described above were analyzed and evaluated in the same manner, as that of the first example.

Samples 2-1 to 2-21 were subjected to an X-ray diffraction measurement. Because Sample 2-14 was produced by spray pyrolysis at a low temperature of 400° C., no diffraction peak appeared within 2θ=33±2°. In the other samples, the diffraction peak existed within the range, and as the half width of the diffraction peak, the values shown in Table 2-1 were obtained. Because Sample 2-1 was produced by subjecting Sample 2-3 to heat treatment at 700° C., the crystallinity increased and accordingly the half width was 0.50. Because Sample 2-7 was produced by spray pyrolysis at a high temperature of 1100° C., the crystallinity increased and accordingly the half width was 0.37.

Because Samples 2-6 and 2-7 each, did not contain the carbon material and accordingly were not a composite grain (s), the sea-islands structure was not observed therein, whereas the sea-islands structure was observed in the other samples and the circle-equivalent diameter is shown in Table 2-1.

Samples 2-1 to 2-8 and 2-10 to 2-21 had the values shown in the "Grain. Size" column in Table 2-2. Sample 2-5 was produced by grinding Sample 2-5 to be a size of 0.1 μm, so that Sample 2-9 was a nonuniformity-shaped fine grain(s) having the mentioned size, not a spherical grain(s). Each of Samples 2-10 and 2-11 was produced by grinding Sample 2-3 and then granulating, so that the size thereof was the size of a spherically-granulated grain(s).

Samples 2-1 to 2-8 and 2-12 to 2-21 bad the values shown in the "Area Rate" column of the "Void in Grain" column in. Table 2-2. Each of Samples 2-10 and 2-11 was produced by grinding Sample 2-3 and then granulating, so that the inside of the spherical grain was dense, and no large void soon as a void of 200 nm or more existed.

The carbon content in each sample was the value shown in Table 2-2. Sample 2-6 was produced by reducing the added amount of glucose so as not to leave carbon. Sample 2-7 was produced by spray pyrolysis in the furnace of a high temperature of 1100° C. so as not to leave carbon.

As shown in Table 2-2, Samples 2-1 to 2-7 and 2-11 to 2-21 had no crack to be seen, and hence their application performance was excellent. Sample 2-8 had a grain size of less than 1 μm, and accordingly, when the applied film was dried, a crack(s) was generated, so that excellent application performance was not obtained. Sample 2-9 was a ground grain(s) and consequently was a no-spherical fine grain(s) of less than 1 μm, and accordingly, when the applied film was dried, a crack(s) was generated, and hence excellent application performance was rust obtained. Sample 2-10 had a grain which is too large, so that, there was a problem in surface roughness caused by the grain.

Samples 2-2 to 2-5, 2-3 to 2-13, and 2-15 to 2-21 each snowed a high initial discharge capacity of 195 mAh/g or more. Among them, Samples 2-8, 2-3, and 2-10 were not those to obtain excellent application performance although snowed such high initial discharge capacity.

TABLE 2-1

| | OXIDE | | | | | | | | |
|---|---|---|---|---|---|---|---|---|---|
| | COMPOSITION (MOLE RATIO) | | | | | HALF WIDTH OF XRD PEAK | CIRCLE-EQUIVALENT DIAMETER | TEMPERATURE OF SPRAY FURNACE | ADDED AMOUNT OF GLUCOSE MOLE RATIO | CONCENTRATION OF METAL ION OXIDE |
| No. | Li | Mn | Si | Al | Mg | [°] | [nm] | [° C.] | (GLUCOSE/OXIDE) | mol/L |
| 2-1 | 2 | 1 | 1 | — | — | 0.50 | 15 | HEAT TREATMENT OF 2-3 AT 700° C. FOR 3 h. | | |

TABLE 2-1-continued

| | OXIDE | | | | | HALF WIDTH OF XRD PEAK | CIRCLE-EQUIVALENT DIAMETER | TEMPERATURE OF SPRAY FURNACE | ADDED AMOUNT OF GLUCOSE MOLE RATIO | CONCENTRATION OF METAL ION OXIDE |
|---|---|---|---|---|---|---|---|---|---|---|
| | COMPOSITION (MOLE RATIO) | | | | | | | | | |
| No. | Li | Mn | Si | Al | Mg | [°] | [nm] | [° C.] | (GLUCOSE/OXIDE) | mol/L |
| 2-2 | 2 | 1 | 1 | — | — | 0.58 | 10 | HEAT TREATMENT OF 2-3 AT 500° C. FOR 1 h. | | |
| 2-3 | 2 | 1 | 1 | — | — | 0.65 | 8 | 800 | 2 | 0.31 |
| 2-4 | 2 | 1 | 1 | — | — | 0.86 | 6 | 550 | 2 | 0.31 |
| 2-5 | 2 | 1 | 1 | — | — | 1.20 | 3 | 500 | 3 | 0.31 |
| 2-6 | 2 | 1 | 1 | — | — | 0.55 | — | 800 | 0.5 | 0.31 |
| 2-7 | 2 | 1 | 1 | — | — | 0.37 | — | 1100 | 2 | 0.31 |
| 2-8 | 2 | 1 | 1 | — | — | 0.62 | 8 | 900 | 2 | 0.1 |
| 2-9 | 2 | 1 | 1 | — | — | 0.68 | 10 | GRIND 2-3 | 2 | 0.31 |
| 2-10 | 2 | 1 | 1 | — | — | 0.68 | 10 | GRIND 2-3 AND GRANULATE | 2 | 0.31 |
| 2-11 | 2 | 1 | 1 | — | — | 0.68 | 10 | GRIND 2-3 AND GRANULATE | 2 | 0.31 |
| 2-12 | 2 | 1 | 1 | — | — | 0.55 | 10 | 900 | 2 | 0.15 |
| 2-13 | 2 | 1 | 1 | — | — | 0.55 | 12 | HEAT TREATMENT OF 2-3 AT 600° C. FOR 3 h. | 2 | 0.31 |
| 2-14 | 2 | 1 | 1 | — | — | — | 2 | 400 | 2.5 | 0.31 |
| 2-15 | 2 | 1 | 1 | — | — | 0.55 | 10 | 1000 | 2 | 0.31 |
| 2-16 | 2 | 1 | 1 | — | — | 0.88 | 4 | 800 | 4 | 0.31 |
| 2-17 | 2 | 1 | 1 | — | — | 0.65 | 8 | 800 | 2 | 0.25 |
| 2-18 | 2 | 1 | 1 | — | — | 0.65 | 8 | 800 | 2 | 0.15 |
| 2-19 | 2 | 1 | 1 | — | — | 0.65 | 6 | 800 | 2 | 0.5 |
| 2-20 | 2.0625 | 1 | 0.9375 | 0.0625 | — | 0.64 | 8 | 800 | 2 | 0.31 |
| 2-21 | 2.0625 | 1 | 0.96875 | — | 0.03125 | 0.63 | 7 | 800 | 2 | 0.31 |

TABLE 2-2

| No. | CARBON CONTENT [mass %] | VOID IN GRAIN (200 nm OR MORE) PRESENCE | VOID IN GRAIN (200 nm OR MORE) AREA RATE [%] | GRAIN SIZE [μm] | INITIAL DISCHARGE CAPACITY (FIFTH DISCHARGE) [mAh/g, 0.2 C] | DISCHARGE CAPACITY AT 2 V (FIFTH DISCHARGE) [mAh/g, 0.2 C] | INITIAL DISCHARGE CAPACITY UNDER HIGH RATE (FIFTH DISCHARGE) [mAh/g, 2.0 C] | APPLICATION PERFORMANCE | REMARK |
|---|---|---|---|---|---|---|---|---|---|
| 2-1 | 12 | YES | 40 | 5 | 150 | 100 | 50 | ○ | COMPARATIVE EXAMPLE |
| 2-2 | 12 | YES | 45 | 5 | 220 | 155 | 150 | ○ | EXAMPLE |
| 2-3 | 12 | YES | 45 | 5 | 220 | 160 | 155 | ○ | EXAMPLE |
| 2-4 | 12 | YES | 45 | 5 | 220 | 160 | 155 | ○ | EXAMPLE |
| 2-5 | 21 | YES | 20 | 6 | 225 | 160 | 143 | ○ | EXAMPLE |
| 2-6 | 0 | YES | 18 | 3 | 80 | 20 | 5 | ○ | COMPARATIVE EXAMPLE |
| 2-7 | 0 | YES | 10 | 2 | 50 | 5 | 4 | ○ | COMPARATIVE EXAMPLE |
| 2-8 | 5 | YES | 20 | 0.7 | 210 | 150 | 150 | X/CRACK | COMPARATIVE EXAMPLE |
| 2-9 | 12 | — | — | — | 200 | 130 | 100 | X/CRACK | COMPARATIVE EXAMPLE |
| 2-10 | 12 | NO | — | 25 | 200 | 135 | 70 | X/SURFACE ROUGHNESS | COMPARATIVE EXAMPLE |
| 2-11 | 12 | NO | — | 20 | 200 | 140 | 80 | ○ | EXAMPLE |
| 2-12 | 6 | YES | 20 | 1 | 195 | 138 | 135 | ○ | EXAMPLE |
| 2-13 | 12 | YES | 45 | 5 | 215 | 123 | 115 | ○ | EXAMPLE |
| 2-14 | 13 | YES | 45 | 6 | 7 | 4 | 1 | ○ | COMPARATIVE EXAMPLE |
| 2-15 | 1 | YES | 20 | 2 | 195 | 135 | 130 | ○ | EXAMPLE |
| 2-16 | 25 | YES | 35 | 6 | 213 | 155 | 145 | ○ | EXAMPLE |
| 2-17 | 11 | YES | 80 | 5 | 223 | 157 | 156 | ○ | EXAMPLE |

TABLE 2-2-continued

| No. | CARBON CONTENT [mass %] | VOID IN GRAIN (200 nm OR MORE) PRESENCE | AREA RATE [%] | GRAIN SIZE [μm] | INITIAL DISCHARGE CAPACITY (FIFTH DISCHARGE) [mAh/g, 0.2 C] | DISCHARGE CAPACITY AT 2 V (FIFTH DISCHARGE) [mAh/g, 0.2 C] | INITIAL DISCHARGE CAPACITY UNDER HIGH RATE (FIFTH DISCHARGE) [mAh/g, 2.0 C] | APPLICATION PERFORMANCE | REMARK |
|---|---|---|---|---|---|---|---|---|---|
| 2-18 | 10 | YES | 90 | 5 | 218 | 155 | 158 | ○ | EXAMPLE |
| 2-19 | 12 | YES | 18 | 3 | 215 | 153 | 105 | ○ | EXAMPLE |
| 2-20 | 12 | YES | 50 | 5 | 235 | 178 | 168 | ○ | EXAMPLE |
| 2-21 | 12 | YES | 45 | 4 | 236 | 175 | 165 | ○ | EXAMPLE |

Third Example

Starting materials used were lithium nitrate (LiNO$_3$), manganese (II) nitrate hexahydrate (Mn(NO$_3$)$_2$.6H$_2$O), iron (III) nitrate nonahydrate (Fe(NO$_3$)$_3$.9H$_2$O), TEOS, aluminum sec-butoxide, and magnesium nitrate hexahydrate (Mg(NO$_3$)$_2$. 6H$_2$O). The materials were dissolved in water in such a way as to be each composition ratio shown in Table 3-1, so that aqueous solutions were prepared. TEOS was dissolved in methoxyethanol in advance, and this solution was dissolved, in the water. When aluminum sec-butoxide was used, aluminum sec-butoxide chemically modified with ethyl acetoacetate was added to the methoxyethanol, in which TEOS was dissolved, to be dissolved therein, and the resulting solution was dissolved in the water. Further, glucose as the organic compound, which produces a carbon material, was added to the aqueous solutions. Each of these aqueous solutions was subjected to spray pyrolysis in a heating furnace heated, at 400 to 1100° C. using a carrier gas composed of nitrogen gas. Thereby, samples were produced.

The solutions each were prepared in such a way that the concentration of metal ions in the solution was within a range of 0.05 to 0.9 mol/L when the composition of the oxide was converted to moles. The glucose was added in such a way that a mole ratio of glucose/oxide was within a range of 0.5 to 4. The crystallinity (half width) was controlled through the added amount of glucose and the temperature of the furnace. The more the remaining carbon is, the harder the crystal growth is and accordingly the lower the crystallinity is. The lower the temperature of the furnace is, the harder the crystal growth is and accordingly the lower the crystallinity is. The grain size was controlled through the concentration of metal ions in the liquid droplets and the glucose content.

Sample 3-2 was produced by subjecting Sample 3-1 to neat treatment at 750° C. for 3 hours in 1% H$_2$/Ar. Sample 3-3 was produced by subjecting Sample 3-1 to wet grinding and then freeze-drying for no granulation. Sample 3-9 was produced by subjecting Sample 3-1 to wet grinding and then granulation during spray-drying. Sample 3-7 was produced by spray pyrolysis in the heating furnace heated at 400° C., and the other samples were produced by spray pyrolysis therein heated at 500° C. or above.

The temperature of the spray furnace, the added amount of glucose, and the concentration of metal ions in the solution regarding each sample are shown in Table 3-1.

The individual Samples 3-1 to 3-14 obtained as described above were analyzed and evaluated in the same manner as that of the first example.

Samples 3-1 to 3-14 were subjected to an X-ray diffraction measurement. Because Sample 3-7 was produced by spray pyrolysis at a low temperature of 400° C., no diffraction peak appeared within 2θ=33±2°. In the other samples, the diffraction peak existed within the range, and as the half width of the diffraction peak, the values shown in Table 3-1 were obtained. Because Sample 3-2 was produced by subjecting Sample 3-1 to heat treatment at 750° C., the crystallinity increased and accordingly the half width was 0.50. Because Sample 3-14 was produced by spray pyrolysis at a high temperature of 1100° C., the crystallinity increased and accordingly the bald width was 0.45.

Because Sample 3-10 did not contain the carbon material and accordingly was not a composite grain(s), the sea-islands structure was not observed therein, whereas the sea-islands structure was observed in the other samples and the circle-equivalent diameter is shown in Table 3-1.

Samples 3-1 to 3-2 and 3-4 to 3-14 had the values shown in the "Grain Size" column in Table 3-2. Sample 3-3 was produced by grinding Sample 3-1 to be a size of 0.2 μm, so that Sample 3-3 was a nonuniformity-shaped fine grain(s) having the mentioned size, not a spherical grain(s). Sample 3-9 was produced, by grinding Sample 3-1 and then granulating, so that the size thereof was the size of a spherically-granulated grain(s).

Samples 3-1, 3-2, 3-4 to 3-8, and 3-10 to 3-14 had the values shown in the "Area Rate" column of the "Void in Grain" column in Table 3-2. Sample 3-9 was produced by grinding Sample 3-1 and then granulating, so that the inside of the spherical grain was dense, and no large void such as a void of 200 nm or more existed.

The carbon content in each sample was the value shown in Table 3-2. Sample 3-10 was produced by reducing the added amount or glucose so as not to leave carbon.

As shown in Table 3-2, Samples 3-1 to 3-2, 3-4 to 3-7, and 3-10 to 3-14 had no crack to be seen, and hence their application performance was excellent. Sample 3-3 was a ground grain(s) and consequently was a no-spherical fine grain(s) of less than 1 μm, and accordingly, when the applied film was dried, a crack(s) was generated, and hence excellent application performance was not obtained. Sample 3-8 was a fine grain (s) having a grain size of less than 1 μm, and when the applied film was dried, a crack(s) was generated, and hence excellent application performance was not obtained. Sample 3-9 had a grain size which is too large, so that there was a problem in surface roughness caused by the grain.

Samples 3-1, 3-3 to 3-6, 3-8, and 3-11 to 3-13 each showed a high initial discharge capacity of 190 mAh/g or more. Among them, Samples 3-3 and 3-8 were not those to obtain excellent application performance although showed such nigh initial discharge capacity.

TABLE 3-1

| No. | OXIDE COMPOSITION (MOLE RATIO) Li | Mn | Fe | Si | Al | Mg | HALF WIDTH OF XRD PEAK [°] | CIRCLE EQUIVALENT DIAMETER [nm] | TEMPERATURE OF SPRAY FURNACE [° C.] | ADDED AMOUNT OF GLUCOSE MOLE RATIO (GLUCOSE/OXIDE) | CONCENTRATION OF METAL ION OXIDE mol/L |
|---|---|---|---|---|---|---|---|---|---|---|---|
| 3-1 | 2 | 0.7 | 0.3 | 1 | — | — | 0.71 | 6 | 800 | 2 | 0.31 |
| 3-2 | 2 | 0.7 | 0.3 | 1 | — | — | 0.50 | 15 | HEAT TREATMENT OF 3-1 AT 750° C. FOR 3 h. | 2 | 0.31 |
| 3-3 | 2 | 0.7 | 0.3 | 1 | — | — | 0.72 | 6 | GRIND 3-1 | 2 | 0.31 |
| 3-4 | 2.0625 | 0.7 | 0.3 | 0.9375 | 0.0625 | — | 0.72 | 6 | 800 | 2 | 0.31 |
| 3-5 | 2.0625 | 0.7 | 0.3 | 0.96875 | — | 0.03125 | 0.68 | 10 | 800 | 2 | 0.31 |
| 3-6 | 2 | 0.7 | 0.3 | 1 | — | — | 1.40 | 2 | 500 | 3 | 0.31 |
| 3-7 | 2 | 0.7 | 0.3 | 1 | — | — | — | 2 | 400 | 3 | 0.31 |
| 3-8 | 2 | 0.7 | 0.3 | 1 | — | — | 0.80 | 5 | 800 | 2 | 0.1 |
| 3-9 | 2 | 0.7 | 0.3 | 1 | — | — | 0.72 | 6 | GRIND 3-1 AND GRANULATE | 2 | 0.31 |
| 3-10 | 2 | 0.7 | 0.3 | 1 | — | — | 0.45 | — | 900 | 0.5 | 0.31 |
| 3-11 | 2.0625 | 0.7 | 0.3 | 0.96875 | — | 0.03125 | 0.72 | 6 | 850 | 2 | 0.2 |
| 3-12 | 2.0625 | 0.7 | 0.3 | 0.96875 | — | 0.03125 | 0.72 | 6 | 900 | 2 | 0.15 |
| 3-13 | 2 | 0.7 | 0.3 | 1 | — | — | 0.55 | 10 | 1000 | 2 | 0.31 |
| 3-14 | 2 | 0.7 | 0.3 | 1 | — | — | 0.45 | 12 | 1100 | 2 | 0.31 |

TABLE 3-2

| No. | CARBON CONTENT [mass %] | VOID IN GRAIN (200 nm OR MORE) PRESENCE | VOID IN GRAIN (200 nm OR MORE) AREA RATE [%] | GRAIN SIZE [µm] | INITIAL DISCHARGE CAPACITY (FIFTH DISCHARGE) [mAh/g, 0.2 C] | DISCHARGE CAPACITY AT 2 V (FIFTH DISCHARGE) [mAh/g, 0.2 C] | INITIAL DISCHARGE CAPACITY UNDER HIGH RATE (FIFTH DISCHARGE) [mAh/g, 2.0 C] | APPLICATION PERFORMANCE | REMARK |
|---|---|---|---|---|---|---|---|---|---|
| 3-1 | 11 | YES | 48 | 3 | 223 | 164 | 158 | ○ | EXAMPLE |
| 3-2 | 11 | YES | 48 | 3 | 175 | 132 | 105 | ○ | COMPARATIVE EXAMPLE |
| 3-3 | 11 | — | — | — | 192 | 140 | 135 | X/CRACK | COMPARATIVE EXAMPLE |
| 3-4 | 12 | YES | 55 | 4 | 225 | 183 | 161 | ○ | EXAMPLE |
| 3-5 | 13 | YES | 50 | 4 | 224 | 184 | 162 | ○ | EXAMPLE |
| 3-6 | 25 | YES | 20 | 5 | 214 | 160 | 147 | ○ | EXAMPLE |
| 3-7 | 20 | YES | 25 | 6 | 15 | 4 | 2 | ○ | COMPARATIVE EXAMPLE |
| 3-8 | 11 | YES | 30 | 0.8 | 215 | 150 | 155 | X/CRACK | COMPARATIVE EXAMPLE |
| 3-9 | 11 | NO | — | 22 | 175 | 124 | 84 | X/SURFACE ROUGHNESS | COMPARATIVE EXAMPLE |
| 3-10 | 0 | YES | 15 | 2 | 74 | 32 | 15 | ○ | COMPARATIVE EXAMPLE |
| 3-11 | 9 | YES | 80 | 4 | 224 | 175 | 165 | ○ | EXAMPLE |
| 3-12 | 10 | YES | 90 | 4 | 224 | 165 | 165 | ○ | EXAMPLE |
| 3-13 | 7 | YES | 40 | 3 | 215 | 145 | 138 | ○ | EXAMPLE |
| 3-14 | 1 | YES | 30 | 2 | 185 | 126 | 115 | ○ | COMPARATIVE EXAMPLE |

INDUSTRIAL APPLICABILITY

The present invention is usable in the field of lithium ion secondary batteries.

The invention claimed is:

1. A cathode material for a lithium ion secondary battery being a composite grain comprising: an oxide including, as constituent elements, Li, Si and at least one of Fe and Mn; and a carbon material, wherein according to a measurement by an X-ray diffraction method using Cu-Kα as an X-ray source, a diffraction peak exists within a range of $2\theta=33\pm2°$ and a half width of the diffraction peak is 0.55° or more, a size of the grain is 1 µm or more and 20 µm or less, and a sea-islands structure is inside the grain in which the oxide is scattered as islands in a sea of the carbon material.

2. The cathode material for a lithium ion secondary battery according to claim 1, wherein a void having a size of 200 nm or more exists inside the grain.

3. The cathode material for a lithium ion secondary battery according to claim 2, wherein an abundance of the void is 20% or more and 80% or less in terms of an area rate in a section of the grain.

4. The cathode material for a lithium ion secondary battery according to claim 1, wherein an average circle-equivalent diameter of the islands of the sea-islands structure is 3 nm or more and 10 nm or less.

5. A cathode member for a lithium ion secondary battery, comprising a metal foil provided with a cathode layer including: the cathode material for a lithium ion secondary battery according to claim 1; and a binder.

6. A lithium ion secondary battery comprising the cathode material for a lithium ion secondary battery according to claim 1.

7. A method for producing the cathode material for a lithium ion secondary battery according to claim 1, comprising:

pyrolyzing a solution in a state of being liquid droplets, the solution including: a compound including elements composing an oxide including Li, Si and at least one of Fe and Mn as constituent elements; and an organic compound which produces a carbon material, to react the compounds with each other; and using a grain obtained through the reaction.

* * * * *